US006328943B1

United States Patent
Roling et al.

(10) Patent No.: US 6,328,943 B1
(45) Date of Patent: Dec. 11, 2001

(54) INHIBITION OF PYROPHORIC IRON SULFIDE ACTIVITY

(75) Inventors: Paul V. Roling, Spring; Wiley L. Parker, Conroe; Alan E. Goliaszewski, The Woodlands; Timothy S. Williams, Houston; Bernard C. Groce, Webster; Quincy K. A. Sintim, Houston, all of TX (US)

(73) Assignee: BetzDearborn Inc., Trevose, PA (US)

( * ) Notice: Subject to any disclaimer, the term of this patent is extended or adjusted under 35 U.S.C. 154(b) by 0 days.

(21) Appl. No.: 09/112,882

(22) Filed: Jul. 9, 1998

(51) Int. Cl.$^7$ .................................................. C01B 17/16
(52) U.S. Cl. ........................................ 423/265; 423/561.1
(58) Field of Search ..................................... 423/265, 268, 423/269, 511, 558, 560, 213.2, 230, 231; 502/20, 22, 34, 500, 501, 506, 401, 514; 252/322, 323, 325, 380; 280/48 AA

(56) References Cited

U.S. PATENT DOCUMENTS

| | | |
|---|---|---|
| 1,853,818 | 4/1932 | Kobbé . |
| 3,453,217 | 7/1969 | Kozlowski et al. . |
| 3,563,912 | 2/1971 | Young . |
| 3,607,675 | 9/1971 | Haines . |
| 3,838,066 | 9/1974 | Lovell . |
| 4,003,856 | 1/1977 | Sharp . |
| 4,176,092 | 11/1979 | Birkenstock et al. . |
| 4,177,136 | 12/1979 | Herrington et al. . |
| 4,224,248 | 9/1980 | Birkenstock et al. . |
| 4,749,468 * | 6/1988 | Roling et al. .................... 208/48 AA |
| 5,089,226 * | 2/1992 | Ohashi et al. ........................ 422/16 |
| 5,158,693 * | 10/1992 | Ramanarayanan et al. ...... 252/8.555 |
| 5,173,213 * | 12/1992 | Miller et al. ........................ 252/394 |
| 5,182,013 * | 1/1993 | Petersen et al. .................... 208/348 |
| 5,264,023 | 11/1993 | Missol et al. . |
| 5,266,186 * | 11/1993 | Kaplan ............................ 208/48 AA |
| 5,405,525 * | 4/1995 | Heyse et al. ........................ 208/133 |
| 5,556,575 * | 9/1996 | Babaian-Kibala et al. .......... 252/394 |
| 5,734,066 * | 3/1998 | Keppel et al. ....................... 549/259 |
| 5,783,109 * | 7/1998 | Sawhney .............................. 252/314 |

FOREIGN PATENT DOCUMENTS 1449138   7/1989   (RU) .

OTHER PUBLICATIONS

Pyrophoric Oxidation of Iron Sliphide, R. Walker et al., *Surface and Coatings Technology*, 34 (1988) 163–175.
The Formation of Pyrophoric Iron Sluphide From Rust, R. Walker et al., *Surface Coatongs Technology*, 31 (1987) 183–197.
Pyrophoric Nature of Iron Sulphides, R. Walker et al., *Ind. Eng. Chem. Res.*, 1996, 35, 1747–1752.
Is pyrophoric iron sulphide a possible source of ignition?, R.I. Hughs et al., *Nature*. vol. 248, Apr. 19, 1974, 670.
Spectroscopy of the Layers Formed On A Steel In the Inhibited H2S–Containing Media and Their Role in the Corosion Process, M.K. Panov et al., *Proceedings of the 8th European Symposium on Corrosion Inhibitors*, Suppl. N. 10, 1995, 1301–1310.

* cited by examiner

*Primary Examiner*—Steven P. Griffin
*Assistant Examiner*—Cam N. Nguyen
(74) *Attorney, Agent, or Firm*—Greenblum & Bernstein, P.L.C.

(57) ABSTRACT

Methods for inhibiting pyrophoric iron sulfide activity are disclosed. Methods are disclosed for inhibiting the sulfidation of iron oxides to iron sulfides and/or the oxidation of iron sulfide to inhibit pyrophoric activity. The methods comprise contacting iron oxides and/or iron sulfide with a liquid, solution, aerosol, or gaseous inhibitor comprising alkylamines, arylamines, imines; oxygen-containing compounds such as alcohols, aldehydes, esters, acids and ketones; mixed nitrogen-containing and oxygen-containing compounds such as alkanolamines, non-polymeric amides, hydroxylamines, Mannich products, polyisobutylenesuccinimides, oximes; sulfur-containing compounds and phosphorus-containing compounds.

42 Claims, No Drawings

INHIBITION OF PYROPHORIC IRON SULFIDE ACTIVITY

FIELD OF THE INVENTION

The present invention relates to compositions for and methods of inhibiting pyrophoric activity of iron sulfide. More particularly, the present invention relates to compositions for and methods of inhibiting the formation of pyrophoric iron sulfide by inhibiting the sulfidation of iron oxides and/or inhibiting the oxidation of iron sulfide.

BACKGROUND OF THE INVENTION

Corrosion of iron by air yields rust, or iron oxides such as goethite (-FeO (OH)), hematite ($Fe_2O_3$) and magnetite ($Fe_3O_4$). Exposure of these iron oxides to hydrogen sulfide rich conditions where oxygen content is low results in a sulfidation reaction which yields mackinawite ($FeS_x$) which can form greigite ($Fe_3S_4$) and/or pyrite ($FeS_2$). This sulfidation step is exothermic. Oxidation of these iron sulfides, as by exposures to air or oxygen rich conditions, is highly exothermic and can result in pyrophoric activity.

Hydrogen sulfide is often present in crude oil and can react with iron oxides formed in transportation, processing or storage vessels. Exposure of the resulting iron sulfides to air can result in pyrophoric activity and a potentially explosive situation. For example, the reaction of hydrogen sulfide with iron oxides present in oil tankers in the area above the liquid crude oil can result in the formation of pyrophoric iron sulfides. Upon discharge of the crude oil, exposure of the iron sulfides to air can result in pyrophoric activity in the head space and explosive results are possible. Similar conditions can exist in other crude oil handling, transporting or processing vessels. In particular, pyrophoric iron sulfides have been found in refinery units, sour water strippers and amine units in addition to oil tankers. These units have reducing atmospheres. When these units are opened up, as for repair or maintenance, exposure to air gives rise to the possibility for the pyrophoric iron sulfides to ignite flammable vapors that are still in the units.

The reactions involved in the formation of iron sulfide and its subsequent oxidation on exposure to oxygen may be represented in a simplified form as follows:
Sulfidation Reaction

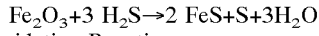

Oxidation Reaction

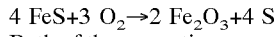

Both of these reactions are exothermic with enthalpy, ΔH, values of −168 and −635 kJ/mol, respectively. If the oxidation reaction is allowed to proceed rapidly with little dissipation of heat, high temperatures leading to glowing and sparking can be expected in the material.

Russian Patent No. 1,449,138 discloses the use of polymer/ionomers containing amide and carboxylate groups to prevent the spontaneous combustion of pyrophoric deposits of iron sulfide. The disclosed method comprises contacting pyrophoric deposits of iron sulfide with an aqueous solution of a deactivating solution of a polymer-ionomer containing amide and carboxylate groups.

SUMMARY OF THE INVENTION

The present inventors have discovered compositions for and methods of inhibiting pyrophoric iron sulfide activity. The compositions and methods of the present invention can inhibit the sulfidation of iron oxide to iron sulfides and/or the oxidation of iron sulfide. The methods of the present invention comprise contacting iron oxides and/or iron sulfide with a liquid, solution, or gaseous inhibitor comprising alkylamines, arylamines, imines; oxygen-containing compounds such as alcohols, aldehydes, esters, acids and ketones; mixed nitrogen-containing and oxygen-containing compounds such as alkanolamines, non-polymeric amides, hydroxylamines, Mannich products, polyisobutylenesuccinimides (PIBSIs), oximes; sulfur-containing compounds and phosphorus-containing compounds. The treatments of the present invention inhibit either the sulfidation and/or the oxidation reactions which can result in the formation and/or pyrophoric activity of iron sulfide.

DETAILED DESCRIPTION OF THE PREFERRED EMBODIMENTS

The present invention provides a method for inhibiting the formation of pyrophoric iron sulfide and/or precursors thereof in the production, transportation and/or storage of petroleum products which contain hydrogen sulfide. The methods of the present invention comprise inhibiting the formation of pyrophoric iron sulfide by inhibiting the sulfidation of iron oxide to yield iron sulfides and/or the oxidation of iron sulfides by contacting the iron oxide or iron sulfide with a liquid, solution, gaseous or aerosol treatment. The treatment comprises alkylamines, arylamines, imines; oxygen-containing compounds such as alcohols, aldehydes, esters, acids and ketones; mixed nitrogen-containing and oxygen-containing compounds such as alkanolamines, non-polymeric amides, hydroxylamines, Mannich products, polyisobutylenesuccinimides (PIBSIs), oximes; sulfur-containing compounds and phosphorus-containing compounds. The amines useful in the methods of the present invention are preferably alkylamines or arylamines which have a boiling point above the temperature of the pyrophoric iron sulfide at the time of treatment, this temperature can vary from ambient temperature up. The preferred oxygen containing compounds are selected from alcohols, aldehydes, esters, acids and ketones preferably having boiling points of greater than about 170° C.

The pyrophoric nature of iron sulfide is well known. The formation of pyrophoric iron sulfide in the vapor areas of oil tankers and refinery units such as sour water strippers and amine scrubbers is considered to be the product of the reaction of hydrogen sulfide present in the hydrocarbon with rust formed by corrosion on the inner surfaces of the steel tanks or equipment. Aging of the materials sometimes increases the tendency of the pyrophoric behavior. At temperatures of 75 to 100° C. sparking can occur as soon as the sulfides are exposed to air The present inventors discovered that the pyrophoric action of iron sulfide and/or precursors thereof can be inhibited by application of solutions, liquid compounds, aerosols, or vapors to iron sulfide solids. The use of vapor or aerosol application is desirable in liquid storage tanks where the iron sulfide can be formed in the areas above the hydrocarbon liquid.

The treatment compounds of the present invention can inhibit the sulfidation step or the oxidation step leading to pyrophoric activity of iron sulfides.

It is theorized that the treatments form coordinate bonds to the iron atom of the oxides or sulfides through the heteroatom of the treatment. When such a bond breaks, if the treatment compound has a high vapor pressure, it will evaporate, leaving an active iron atom. Such coordinate bonds are strongest for trisubstituted nitrogen compounds such as amines, less strong for nitrites and oxygen-containing compounds. While this theory is believed to be accurate, it is not intended to be limiting with respect to the scope of the present invention.

The treatment compounds of the present invention can include nitrogen-containing compounds such as alkylamines, arylamines, imines; oxygen-containing compounds such as alcohols, aldehydes, esters, acids and ketones; mixed nitrogen-containing and oxygen-containing compounds such as alkanolamines, non-polymeric amides, hydroxylamines, Mannich products, polyisobutylenesuccinimides (PIBSIs), oximes; sulfur-containing compounds and phosphorous-containing compounds.

Examples of alkylamines are n-propylamine, isopropylamine, n-butylamine, iso-butylamine, sec-butylamine, tert-butylamine, n-pentylamine, n-hexylamine, n-heptylamine, n-octylamine, n-nonylamine, n-decylamine, stearylamine, oleylamine, diethylamine, di-n-propylamine, di-iso-propylamine, di-n-butylamine, di-iso-butylamine, di-sec-butylamine, di-tert-butylamine, di-n-pentylamine, di-n-hexylamine, di-n-heptylamine, di-n-octylamine, di-n-nonylamine, di-n-decylamine, distearylamine, triethylamine, tri-n-propylamine, tri-iso-propylamine, tri-n-butylamine, tri-iso-butylamine, tri-sec-butylamine, tri-tert-butylamine, tri-n-pentylamine, tri-n-hexylamine, tri-n-heptylamine, tri-n-octylamine, tri-n-nonylamine, tri-n-decylamine, tristearylamine, cyclohexylamine, N-methylcyclohexylamine, N,N-dimethylcyclohexylamine, cyclopentyl-amine, ethylenediamine, diethylenetriamine, triethylenetertamine, tetraethylenepentamine, tetramethylethylenediamine, 1,2-propylene-diamine, 1,3-propylenediamine, polyethylenamine, benzylamine, phenethylamine, geranylamine, imidazolines, 3-methoxypropylamine, N-(2-aminoethyl)piperazine, tert-amyl-tert-octylamine, 1-adamantanamine.

Examples of arylamines are aniline, N-methylaniline, N,N-dimethylaniline, N-ethylaniline, N,N-diethylaniline, 2-methylaniline, 3-methylaniline, 4-methylaniline, 2-ethylaniline, 3-ethylaniline, 4-ethylaniline, pyridine, 2-aminopyridine, quinoline, isoquinoline, p-phenylenediamine, o-phenylenediamine, m-phenylenediamine, N,N'-bis-(sec-butyl)-p-phenylenediamine, N,N'-dimethyl-p-phenylene-diamine, N-methyl-p-phenylenediamine.

Examples of imines are N,N'-bis(salicylidene)-1,6-hexanediamine, N,N'-bis(salicylidene)-1,4-butanediamine, N,N'-bis(salicylidene)-1,3-propanediamine, N,N'-bis(salicylidene)ethylenediamine.

Examples of nitriles are cis-2-pentenenitrile, 2-pyridylacetonitrile, benzonitrile, 3-anilinopropionitrile, cinnamonitrile, adiponitrile, phenyleneacetonitrile, heptanenitrile, p-tolunitrile.

Examples of alcohols are ethanol, n-propanol, iso-propanol, n-butanol, iso-butanol, sec-butanol, tert-butanol, cyclopentanol, cyclohexanol, ethylene glycol, diethylene glycol, triethylene glycol, catechol, tert-butylcatechol, phenol, 2-methylphenol, 3-methylphenol, 4-methylphenol, 1,5-pentanediol, phenol, o-cresol, m-cresol, p-cresol, eugenol, 1,9-nonanediol, 1-naphthol, 2-methylcyclohexanol, isoborneol, benzyl alcohol, cholesterol, 1,4-butanediol, pentaerythritol, oleyl alcohol, poly(vinyl alcohol), cis-1,2-cyclopentanediol.

Examples of aldehydes are octanal, butanal, pentanal, hexanal, heptanal, nonanal, decanal, 2-ethylhexanal, benzaldehyde, p-anisaldehyde, 2-hydroxy-5-methylbenzaldehyde, glyceraldehyde, p-tolualdehyde, salicylaldehyde.

Examples of ketones are acetone, 2-butanone, 2-pentanone, 3-pentanone, 2-hexanone, 3-hexanone, 4-methyl-2-pentanone, 3-methyl-2-pentanone, cyclopentanone, cyclohexanone, acetophenone, 2'-methyl-acetophenone, 3'-methyl-acetophenone, 4'-methyl-acetophenone, benzophenone, benzylacetone, 2'-hydroxyacetophenone, 9-fluorenone.

Examples of carboxylic acids are acetic acid, propanoic acid, butanoic acid, isobutyric acid, pentanoic acid, hexanoic acid, heptanoic acid, octanoic acid, nonanoic acid, decanoic acid, 3-methyladipic acid, stearic acid, oleic acid, eicosanoic acid, lactic acid, glycolic acid, malic acid, succinic acid, maleic acid, benzoic acid, salicylic acid, trimethyl-acetic acid, thiosalicylic acid, thiolactic acid, thiodiglycolic acid, 2-pyridinecarboxylic acid, mercaptoacetic acid.

Examples of esters are ethyl acetoacetate, methyl lactate.

Examples of alkanolamines are monoethanolamine, diethanolamine, triethanolamine, N-methylmonoethanolamine, N,N-dimethylmonoethanolamine, N-methyidiethanolamine, N-ethyidiethanolamine, N,N-diethylethanolamine, N-propyidiethanol-amine, N-octyidiethanolamine, monopropanolamine, dipropanolamine, tripropanolamine, 8-hydroxyquinoline, 2-aminophenol.

Examples of non-polymeric amides are N,N-dimethylformamide, o-toluamide, succinamide, acetamide, benzamide, formamide, N,N-dimethylacetamide, N-ethylacetamide.

Examples of hydroxylamines are N,N-diethylhydroxylamine (DEHA), N,N-di-n-propylhydroxylamine, N,N-di-iso-propylhydroxylamine, N,N-bis-(2-hydroxypropyl)hydroxylamine, N-ethylhydroxylamine, N,N-dibenzylhydroxylamine, N-benzylhydroxylamine.

Examples of Mannich products are reaction products of phenol or alkylphenols with an aldehyde and an amine as for example exemplified in U.S. Pat. No. 4,749,468 incorporated herein by reference.

Examples of polyisobutylenesuccinimides (PIBSIs) are reaction products of polyisobutylenesuccinic anhydride with primary amine compounds and preferably polyalkyeneamines with at least one primary amine. The polyisobutylene portion of the molecule could also be any other alkyl or polyalkylene such as methyl, butyl, cyclohexyl, polyethylene, or polypropylene.

Examples of oximes are acetone oxime, cyclopentanone oxime, cyclohexanone oxime, dimethylglyoxime, 2-pyridinealdoxime, 1,2-cyclohexanedione dioxime, 2-indanone oxime, 2-heptanone oxime, 4-methyl-2-pentanone oxime, salicylaldoxime, 1-phenyl-1,2-propanedione 2-oxime, benzaldehyde oxime.

Examples of phosphorous compounds are triethyl phosphite, dibenzyl phosphite, triphenyl phosphite, triphenylphosphine oxide, triphenylphosphine, triisodecyl phosphite, isooctyl diphenyl phosphite, triphenyl phosphate.

Examples of sulfur compounds are 2,3-toluenedithiol, sulfolane, 2-aminothiophenol, butyl sulfoxide, butyl sulfone, p-tolyl sulfone, benzyl sulfone, 2-mercaptoethanol.

Preferred treatment compounds include but are not limited to iso-butylamine, n-propylamine, diethylamine, ethanol, octanal, t-butylcatechol (TBC), triethylene glycol (TEG), ethylene glycol, triethylenetetramine (TETA), N,N'-bis-(sec-butyl) -p-phenylenediamine, dimethylformamide (DMF), triethyl phosphite (TEP), quinoline, imidazoline, tetramethylethylenediamine (TMEDA), cis-2- pentenenitrille, polyisobutylenesuccinimide (PIBSI), acetone oxime, acetone, acetic acid, propanoic acid, ethyl acetoacetate, cyclohexanone, the Mannich product of p-nonylphenol/ethylenediamine (EDA)/formaldehyde at a molar ratio of 2/1/2.

The treatment compounds can be added to the iron oxides or pyrophoric iron sulfides in neat form or as a solution when dissolved in a solvent. The solvent can be water or any suitable organic solvent, such as heavy aromatic naphtha.

The treatment compound should have a boiling point above the temperature of the iron oxides or pyrophoric iron sulfides when the treatment compound is applied. Preferably the temperature difference between the boiling point of the treatment and the treatment temperature is about 30° C. for oxides and about 50° C. for sulfides.

Enough treatment compound is added to retard the sulfidation or oxidation reaction. That means approximately a chemical equivalent amount of treatment compound, based on active heteroatoms, to iron compound. Depending on the particle size of the iron compound, less than equivalent amounts of treatment compound may be needed, because only surface iron atoms should be immediately active.

EXAMPLES

The present invention will now be further described with reference to a number of specific examples which are to be regarded as illustrative, and not as restricting the scope of the invention.

The effect of treatment compounds on the pyrophoric activity of iron sulfide was studied in an apparatus which comprised a fritted glass funnel fitted with a filter paper to prevent iron oxide (5.5 g, 34 mmol) from clogging the frit. The bottom of the funnel was fitted with a two-way valve which allowed connection to a hydrogen sulfide generator or a vacuum pump. The top of the funnel was sealed with a rubber stopper fitted with a thermocouple that was placed in the iron oxide material in the funnel and a glass tube connected to a three-way valve. The three-way valve was connected to an exit line to a hydrogen sulfide caustic scrubber, a line for argon purge and a burette. The hydrogen sulfide generator consisted of a three-necked round bottom flask in which sulfuric acid (50 mL of 20%) was added at a rate of 8.8 mL/min by means of a syringe pump to $Na_2S \cdot 9H_2O$ (30 g, 125 mmol) dissolved in deionized water (25 mL). The three-necked flask was equipped with a magnetic stirrer and three septum caps. In the septum caps were placed a needle for sulfuric acid delivery, a needle for argon or air purging and an exit tube to carry the hydrogen sulfide gas to the fritted glass funnel. Argon was purged through the entire apparatus for 30 minutes at a rate of 330 mL/min. Hydrogen sulfide gas was carried by argon purge to the iron oxide material which was in the fritted glass funnel which turned to black pyrophoric iron sulfide and produced a temperature of between 120 and 200° F. After the temperature returned to ambient, the treatment to be tested was placed in the burette and added to the funnel under slight vacuum. After about ten seconds the treatment liquid was drawn off with a vacuum. Fifteen milliliters of pentane or acetone was added by means of the burette to wash off excess treatment liquid and the funnel placed under vacuum for five to fifteen minutes. Alternatively, the treatment was placed in the flask as a vapor by first flushing with argon and thereafter passing argon over the treatment to vaporize it and transport it on to the iron sulfide. Air was then added to the apparatus and any temperature change and color changes noted.

Treatment procedure A employed the above apparatus and involved contacting the iron oxide with hydrogen sulfide prior to application of the treatment compound. Treatment procedure A was a determination of the effect of the treatment compound on the oxidation reaction. Treatment procedure B employed the above apparatus and involved application of the treatment compound prior to contacting the iron oxide with hydrogen sulfide. Treatment procedure B was a determination of the effect of the treatment compound on the sulfidation reaction.

Example 1

A series of temperature measurements were taken with the above described apparatus without the addition of any treatment compound in order to establish a baseline for the temperatures of the sulfidation and oxidation steps for hematite, magnetite and goethite. Table 1 summarizes the data.

TABLE 1

Untreated Runs for Hematite, $Fe_2O_3$(<100 Mesh); Magnetite, $Fe_3O_4$(<325 mesh); and Goethite, FeO(OH) (30–50 mesh)
Procedure A

| Iron Oxide | Sulfidation Temperature (° C.) | Oxidation Temperature (° C.) |
| --- | --- | --- |
| Hematite | 53 | 254 |
| Hematite | 53 | 274 |
| Hematite | 56 | 324 |
| Hematite | 59 | 119 |
| Hematite | 63 | 354 |
| Hematite | 71 | 324 |
| Hematite | 96 | 135 |
| Hematite | 99 | 268 |
| Hematite | 71 | 207 |
| Hematite | 75 | 141 |
| Hematite | 51 | 46 |
| Hematite | 63 | 157 |
| Hematite | 51 | 305 |
| Hematite | 57 | 404 |
| Hematite | 49 | 326 |
| Hematite | 53 | 216 |
| Average | 64 ± 15 | 241 ± 100 |
| Magnetite | 59 | 206 |
| Magnetite | 57 | 198 |
| Magnetite | 53 | 119 |
| Magnetite | 36 | 293 |
| Magnetite | 46 | 425 |
| Magnetite | 48 | 297 |
| Magnetite | 30 | 245 |
| Average | 47 ± 11 | 255 ± 97 |
| Goethite | 51 | 97 |
| Goethite | 54 | 149 |
| Goethite | 28 | 257 |
| Goethite | 62 | 137 |
| Average | 49 ± 15 | 160 ± 68 |

The oxidation temperature for hematite can be seen to be about 241° C., with all but one run being above 119° C. Thus, for treated reactions to be considered successful, temperatures would have to be less than about 50° C. and preferably below about 38° C. With magnetite or goethite, the temperature of the sulfidation step was not as large as with hematite, however, the oxidation temperatures were as large showing that if dry iron oxide exists, hydrogen sulfide vapors can form pyrophoric iron sulfide.

Example 2

Nitrogen compounds were added, as a vapor, to pyrophoric iron sulfide prepared from hematite ($Fe_2O_3$), in accordance with procedure A described above. Table 2 summarizes the result.

TABLE 2

Treatment Compounds Added as Vapor to Pyrophoric
Iron Sulfide Prepared from Hematite, Fe$_2$O$_3$
Procedure A

| TREATMENT (10 mL) | bp (° C.) | Sulfidation Temperature (° C.) | Oxidation Temperature (° C.) |
|---|---|---|---|
| NH4OH (50 mL) | — | 61 | 304 |
| iso-butylamine | 68 | 77 | 74 |

Table 2 shows that the vapor phase application of amine, iso-butylamine, retarded the oxidation step. Ammonia did not provide retardation, indicating that higher boiling point amines will retard pyrophoric iron sulfide by vapor phase application.

Example 3

The treatment compounds listed below in Table 3 were added as a vapor to hematite (Fe$_2$O$_3$), according to procedure B described above. Table 3 summarizes the results.

TABLE 3

Compounds Added as Vapors to Hematite, Fe$_2$O$_3$,
Before Adding Hydrogen Sulfide
Procedure B

| TREATMENT (10 mL) | bp (° C.) | Sulfidation Temperature (° C.) | Oxidation Temperature (° C.) |
|---|---|---|---|
| n-propylamine | 48 | 27 | 36 |
| iso-butylamine | 68 | 24 | 39 |
| diethylamine | 55 | 28 | 45 |
| trimethylamine | 3 | 33 | 233 |
| acetonitrile | 82 | 31 | 117 |
| ethanol | 78 | 26 | 45 |
| acetone | 56 | 27 | 57 |

Example 4

The treatment compounds listed below in Table 4 were added, as a vapor, to magnetite (Fe$_3$O$_4$) according to procedure B described above. Table 4 summarizes the results.

TABLE 4

Compounds Added as Vapors to Magnetite, Fe$_3$O$_4$,
Before Adding Hydrogen Sulfide
Procedure B

| TREATMENT (10 mL) | bp (° C.) | Sulfidation Temperature (° C.) | Oxidation Temperature (° C.) |
|---|---|---|---|
| iso-butylamine | 68 | 24 | 37 |
| acetone | 56 | 31 | 185 |
| ammonium hydroxide | — | 38 | 94 |
| ammonia | −33 | 35 | 121 |

Example 5

Iso-butylamine was added, as a vapor, to goethite (FeO(OH)) according to procedures A and B described above. Table 5 describes the results.

TABLE 5

Compounds Added as Vapors to Goethite, FeO(OH)

| TREATMENT (10 mL) | Procedure | bp (° C.) | Sulfidation Temperature (° C.) | Oxidation Temperature (° C.) |
|---|---|---|---|---|
| iso-butylamine | A | 68 | 53 | 29 |
| iso-butylamine | B | 68 | 61, 61 | 42, 47 |

The data in Tables 2–5 show that amines with boiling points of about 48° C. and higher, ethanol and acetone retarded the sulfidation of the iron oxides and/or the oxidation of iron sulfides. While a high boiling point treatment compound is needed, a treatment compound with too low of a vapor pressure may not yield sufficient vapors to retard the iron oxide or sulfide deposit. Therefore, the choice of treatment depends on such factors as temperature, pressure, volume, and amount of iron compounds.

Example 6

The treatment compounds listed below in Table 6 were added as a liquid to hematite (Fe$_2$O$_3$) according to procedure B described above. Table 6 summarizes the results.

TABLE 6

Compounds Added to Hematite, Fe$_2$O$_3$, Before Adding Hydrogen Sulfide
Procedure B

| TREATMENT (10 mL) | bp (° C.) | Solvent Washing (15 mL) | Sulfidation Temp (° C.) | Oxidation Temp (° C.) |
|---|---|---|---|---|
| Pentane[a] | 36 | none | 77 | 382 |
| TETA | 266 | Pentane | 28 | 27 |
| TETA/tetrahydrofuran (THF[b]) | 266 | THF[c] | 27, 27, 28 | 32, 29, 47 |
| N,N'-bis-(sec-butyl)-p-phenylenediamine[d] | ~250 | Pentane[e] | 30 | 40 |
| Mannich product[f]/THF[b] | ~350 | THF[c] | 28 | 28 |
| N,N-dimethylformamide (DMF) | 153 | Pentane | 30 | 28 |
| N,N-diethylhydroxylamine (DEHA) | 125 | Pentane | 69 | 66 |
| Acetic acid | 118 | Pentane | 25 | 28 |
| Ethanol | 78 | Acetone | 27 | 31 |
| TEG | 288 | Pentane | 31 | 30 |
| Butyl acetate | 124 | Pentane | 33 | 83 |
| Water/ethanol[g] | 100 | acetone | 28 | 31 |
| Water/ethanol[h] | 100 | acetone | 26 | 29 |
| Water/Aliquat 336[i] | 100 | Acetone | 27 | 29 |
| TEP | 156 | Pentane | 24 | 32 |

[a]15 mL used
[b]10/15 mL used
[c]25 mL used
[d]25% active in heavy aromatic naphtha (HAN)
[e]45 mL used
[f]Mannich product of p-nonylphenol/ethylenediamine (EDA)/formaldehyde in molar ratio of 2/1/2; 25% active in heavy aromatic naphtha (HAN)
[g]4/1 mL used
[h]2.5/2.5 mL used
[i]10/2 mL used

Example 7

The treatment compounds listed below in Table 7 were added, as a liquid, to magnetite (Fe$_3$O$_4$) according to procedure B described above. Table 7 summarizes the results.

TABLE 7

Compounds Added to Magnetite, $Fe_3O_4$, Before Adding Hydrogen Sulfide Procedure B

| TREATMENT (10 mL) | bp (° C.) | Solvent Washing (15 mL) | Sulfidation Temperature (° C.) | Oxidation Temperature (° C.) |
|---|---|---|---|---|
| DMF | 153 | Pentane | 37 | 36 |
| DEHA | 125 | Pentane | 28 | 33 |
| TETA | 266 | Pentane | 31, 26 | 32, 26 |

Example 8

The treatment compounds listed below in Table 8 were added, as a liquid, to goethite (FeO(OH)) according to procedure B described above. Table 8 summarizes the results.

TABLE 8

Compounds Added as Liquids with a pentane wash to Goethite, FeO(OH)

| TREATMENT (10 mL) | Procedure | bp (° C.) | Sulfidation Temperature (° C.) | Oxidation Temperature (° C.) |
|---|---|---|---|---|
| TETA | B | 266 | 38 | 32 |

The data in Tables 6–8 show that the sulfidation step is retarded with liquid treatments containing amines, Mannich products, carboxylic acids, alcohols, hydroxylamines, non-polymeric amides, esters, and phosphites.

Example 9

The treatment compounds listed below in Table 9 were added, as a liquid, to hematite ($Fe_2O_3$) according to procedure A described above. Table 9 summarizes the results.

TABLE 9

Treatment Compounds Added to Pyrophoric Iron Sulfide Prepared from Hematite, $Fe_2O_3$
Procedure A

| TREATMENT (10 mL) | bp (° C.) | Wash Solvent (15 mL) | Sulfidation Temperature (° C.) | Vacuum Time (min) | Oxidation Temperature (° C.) |
|---|---|---|---|---|---|
| aniline | 184 | pentane | 57 | 15 | 32 |
| iso-butylamine | 68 | acetone | 57 | 15 | 64 |
| iso-butylamine | 68 | pentane | 53 | 15 | 39 |
| fatty acid imidazoline | ~290 | acetone | 58, 61 | 15 | 34, 33 |
| fatty acid imidazoline[a] | ~290 | none | 85 | 5 | 37 |
| fatty acid imidazoline[a] | ~290 | pentane | 88 | 10 | 54 |
| quinoline | 237 | acetone | 69 | 15 | 31 |
| TETA | 266 | pentane | 60, 66 | 5 | 36, 28 |
| TMEDA | 120 | acetone | 70 | 15 | 33 |
| N,N'-bis-(sec-butyl)-p-phenylenediamine | ~250 | pentane | 66, 53 | 15 | 32, 29 |
| N,N'-bis-(sec-butyl)-p-phenylenediamine[b] | ~250 | pentane | 64 | 5 | 383 |
| acetonitrile | 82 | pentane | 66, 66 | 15 | 234, 234 |
| cis-2-pentenenitrile | 127 | acetone | 71 | 15 | 34 |

[a]Dissolved in 15 mL of pentane
[b]25% active in heavy aromatic naphtha (HAN)

Example 10

The treatment compounds listed below in Table 10 were added, as a liquid, to hematite ($Fe_2O_3$) according to procedure A described above. Table 10 summarizes the results.

TABLE 10

Treatment Compounds Added to Pyrophoric Iron Sulfide Prepared from Hematite, $Fe_2O_3$
Procedure A

| TREATMENT (10 mL) | bp (° C.) | Wash Solvent (15 mL) | Sulfidation Temperature (° C.) | Vacuum Time (min) | Oxidation Temperature (° C.) |
|---|---|---|---|---|---|
| DMF | 153 | pentane | 68, 83 | 5 | 34, 49 |
| Mannich product[a] | ~350 | acetone | 61 | 15 | 49 |
| Mannich product[a] | ~350 | pentane | 61 | 5 | 31 |
| Mannich product[b] | ~350 | pentane | 79 | 5 | 29 |
| PIBSI[c] | ~390 | acetone | 66 | 15 | 24 |
| PIBSI[c,d] | ~390 | pentane | 89 | 5 | 43 |
| DEHA | 125 | acetone | 71, 66 | 15 | 138, 313 |
| DEHA | 125 | pentane | 52 | 15 | 382 |
| nitrobenzene | 210 | acetone | 70 | 15 | 202 |
| nitrobenzene | 210 | pentane | 51 | 15 | 87 |
| acetone oxime[e] | 135 | acetone | 51 | 15 | 32 |

[a]Mannich product of p-nonylphenol/ethylenediamine (EDA)/formaldehyde in molar ratio of 2/1/2; 25% active in heavy aromatic naphtha (HAN)
[b]Mannich product of p-nonylphenol/ethylenediamine (EDA)/formaldehyde in molar ratio of 2/1/2; 35% active in heavy aromatic naphtha (HAN)
[c]Polyisobutylenesuccinimide, MW ~1500, DETA used in imide
[d]Dissolved in 15 mL of pentane
[e]Dissolved in 10 mL of acetone

Example 11

The treatment compound listed below in Table 11 was added, as a liquid, to magnetite ($Fe_3O_4$) according to procedure A described above.

TABLE 11

Compounds Added to Pyrophoric Iron Sulfide Prepared from Magnetite, $Fe_3O_4$ (<325 mesh)
Procedure A

| TREATMENT (10 mL) | bp (° C.) | Wash Solvent (15 mL) | Sulfidation Temperature (° C.) | Oxidation Temp (° C.) |
|---|---|---|---|---|
| TETA | 266 | pentane | 70 | 33 |

Example 12

The treatment compound listed below in Table 12 was added, as a liquid, to goethite (FeO(OH)) according to procedure A described above. Table 12 summarizes the results.

TABLE 12

Compounds Added as Liquids with a pentane wash to Goethite, FeO(OH)

| TREATMENT (10 mL) | Procedure | bp (° C.) | Sulfidation Temperature (° C.) | Oxidation Temperature (° C.) |
|---|---|---|---|---|
| TETA | A | 266 | 70 | 31 |

The data in Tables 9–12 show that liquid, nitrogen-containing treatments of amines, selected nitrites, amides, imides, Mannich products, and oximes retard the oxidation of pyrophoric iron.

Example 13

The treatment compounds listed below in Table 13 were added, as a liquid, to hematite ($Fe_2O_3$) according to procedure A described above. Table 13 summarizes the results.

TABLE 13

Treatment Compounds Added to Pyrophoric Iron Sulfide Prepared from Hematite, $Fe_2O_3$
Procedure A

| TREATMENT (10 mL) | bp (° C.) | Wash Solvent (15 mL) | Sulfidation Temperature (° C.) | Vacuum Time (min) | Oxidation Temperature (° C.) |
|---|---|---|---|---|---|
| acetic acid | 118 | pentane | 85 | 5 | 92 |
| propanoic acid | 141 | acetone | 64 | 15 | 77 |
| ethanol | 78 | pentane | 66, 82 | 5 | 76, 56 |
| ethylene glycol | 197 | acetone | 65 | 15 | 49 |
| TBC | 285 | acetone | 63 | 15 | 48 |
| TEG | 288 | acetone | 64 | 15 | 28 |
| TEG | 288 | pentane | 68, 71 | 5 | 31, 30 |
| acetaldehyde | 20 | pentane | 63 | 5 | 350 |
| octanal | 171 | acetone | 57 | 15 | 34 |
| butyl acetate | 124 | acetone | 78, 66 | 15 | 208, 208 |
| butyl acetate | 124 | pentane | 66 | 15 | 262 |
| ethyl acetoacetate | 181 | pentane | 91 | 5 | 59 |
| monoglyme | 83 | acetone | 57 | 15 | 454 |
| monoglyme | 83 | pentane | 53 | 15 | 360 |
| THF | 66 | none | 71 | 5 | 311 |
| THF | 66 | pentane | 74 | 5 | 274 |
| acetone | 56 | none | 61 | 15 | 304 |
| acetone | 56 | none | 67 | 5 | 66 |
| acetone | 56 | none | 88 | 0 | 54 |
| acetone | 56 | pentane | 72, 74, 77 | 5 | 346, 282, 316 |
| cyclohexanone | 156 | pentane | 79 | 5 | 81 |
| 2,4-pentanedione | 139 | acetone | 57 | 15 | 382 |
| 2,4-pentanedione | 139 | pentane | 76 | 15 | 456 |
| water | 100 | acetone | 72 | 15 | 78 |

Example 14

The treatment compound listed below in Table 14 was added, as a liquid, to magnetite ($Fe_3O_4$) according to procedure A described above. Table 14 summarizes the results.

TABLE 14

Compounds Added to Pyrophoric Iron Sulfide Prepared from Magnetite, $Fe_3O_4$ (<325 mesh)
Procedure A

| TREATMENT (10 mL) | bp (° C.) | Wash Solvent (15 mL) | Sulfidation Temperature (° C.) | Oxidation Temp (° C.) |
|---|---|---|---|---|
| TEG | 288 | pentane | 54 | 33 |

Example 15

The treatment compounds listed below in Table 15 were added, as a liquid, to hematite, $Fe_2O_3$, according to procedure A described above. Table 15 summarizes the results.

TABLE 15

Phosphorous Compounds Added to Pyrophoric Iron Sulfide Prepared from Hematite, $Fe_2O_3$
Procedure A

| TREATMENT (10 mL) | bp (° C.) | Wash Solvent (15 mL) | Sulfidation Temperature (° C.) | Vacuum Time (min) | Oxidation Temperature (° C.) |
|---|---|---|---|---|---|
| triphenylphosphine[a] | 377 | acetone | 71 | 15 | 78 |
| tributyl phosphite | ~260 | acetone | 69 | 15 | 377 |
| tributyl phosphite | ~260 | pentane | 74 | 15 | 126 |

[a]Dissolved 5 g in 10 mL of acetone

Example 16

The treatment compounds listed below in Table 16 were added, as a liquid, to hematite, $Fe_2O_3$, according to procedure A described above. Table 16 summarizes the results.

TABLE 16

Sulfur Compounds Added to Pyrophoric Iron Sulfide Prepared from Hematite, $Fe_2O_3$
Procedure A

| TREATMENT (10 mL) | bp (° C.) | Wash Solvent (15 mL) | Sulfidation Temperature (° C.) | Vacuum Time (min) | Oxidation Temperature (° C.) |
|---|---|---|---|---|---|
| 1,2-ethanedithiol[a] | 144 | pentane | 79 | 5 | 104 |
| 1,2-ethanedithiol | 144 | pentane | 73 | 5 | 421 |
| 2,3-toluenedithiol | ~260 | acetone | 71 | 15 | 31 |
| sulfolane | 287 | acetone | 49 | 15 | 191 |
| sulfolane | 287 | pentane | 66 | 15 | 30 |

[a]Used 2 mL

The data in Tables 13–16 show that selected liquid, oxygen-containing treatments of acids, alcohols, aldehydes, ketones, esters, phosphorus compounds and sulfur compounds retard the oxidation of pyrophoric iron sulfides and/or sulfidation of iron oxides.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of inhibiting pyrophoric activity of iron sulfides comprising contacting iron sulfides and/or precursors thereof in the presence of air with an effective inhibiting amount of a treatment compound to inhibit pyrophoric activity of the iron sulfides, said compound being amine, alcohol, ketone, or mixtures thereof.

2. The method of claim 1 wherein said amine comprises alkylamine, arylamine, and alkanolamine.

3. The method of claim 1 wherein said treatment compound is in a liquid state.

4. The method of claim 1 wherein the treatment compound being alcohol, ketone, or mixtures thereof, and wherein the iron sulfides and/or precursors are present on an inner surface of steel equipment.

5. The method of claim 4 wherein said treatment compound is in a liquid state.

6. A method of inhibiting pyrophoric activity of iron sulfides comprising contacting iron oxides in the presence of air with an effective amount of a treatment compound to inhibit pyrophoric activity of the iron sulfides, said compounds being amine, Mannich reaction products of phenol or alkylphenol with an aldehyde and an amine, carboxylic acid, alcohol, nonpolymeric amide, ester, phosphite, or mixtures thereof.

7. The method of claim 6 wherein said amine comprises alkylamine, arylamine, and alkanolamine.

8. The method of claim 6 wherein said treatment compound is in a liquid state.

9. The method of claim 6 wherein said treatment compound is a solution.

10. The method of claim 6, wherein the treatment compound being Mannich reaction products of phenol or alkylphenol with an aldehyde and an amine, carboxylic acid, alcohol, nonpolymeric amide, ester, phosphite, or mixtures thereof, and wherein the iron oxides are present on an inner surface of steel equipment.

11. The method of claim 10 wherein said treatment compound is in a liquid state.

12. The method of claim 10 wherein said treatment compound is a solution.

13. A method of inhibiting pyrophoric activity of iron sulfides comprising contacting iron sulfides in the presence of air with an effective inhibiting amount of a treatment compound to inhibit pyrophoric activity of the iron sulfides, said compound being amine, nonpolymeric amide, nitrile, imide, Mannich reaction products of phenol or alkylphenol with an aldehyde and an amine, oxime, or mixtures thereof.

14. The method of claim 13 wherein said amine comprises alkylamine, arylamine, and alkanolamine.

15. The method of claim 13 wherein said treatment compound is in a liquid state.

16. The method of claim 13 wherein said treatment compound is a solution.

17. The method of claim 13, wherein the treatment compound being nitrile, Mannich reaction products of phenol or alkylphenol with an aldehyde and an amine, oxime, or mixtures thereof, and wherein the iron sulfides are present on an inner surface of steel equipment.

18. The method of claim 17 wherein said treatment compound is in a liquid state.

19. The method of claim 18 wherein said treatment compound is a solution.

20. A method of inhibiting pyrophoric activity of iron sulfides comprising contacting iron sulfides and/or precursors thereof in the presence of air with an effective inhibiting amount of a treatment compound to inhibit pyrophoric activity of the iron sulfides, said compound being carboxylic acid, alcohol, aldehyde, ketone, ester, phosphate, phosphite, thallus, sulfolane, or mixtures thereof.

21. The method of claim 20 wherein said treatment compound is in a liquid state.

22. The method of claim 20 wherein said treatment compound is a solution.

23. The method of claim 20, wherein the treatment compound being carboxylic acid, alcohol, aldehyde, ketone, ester, phosphate, phosphite, thallus, sulfolane, or mixtures thereof, and wherein the iron sulfides and/or precursors are present on an inner surface of steel equipment.

24. The method of claim 23 wherein said treatment compound is in a liquid state.

25. A method of inhibiting pyrophoric activity of iron sulfides comprising contacting iron oxides with an effective inhibiting amount of a treatment compound in an aerosol or in a gaseous state to inhibit pyrophoric activity of the iron sulfides, said compound being amine, Mannich reaction products of phenol or alkylphenol with an aldehyde and an amine, carboxylic acid, alcohol, nonpolymeric amide, ester, phosphite, or mixtures thereof.

26. The method of claim 25 wherein the treatment compound is in an aerosol.

27. The method of claim 26 wherein said amine comprises alkylamine, arylamine, and alkanolamine.

28. The method of claim 25 wherein the treatment compound is in a gaseous state.

29. The method of claim 28 wherein said amine comprises alkylamine, arylamine, and alkanolamine.

30. A method of inhibiting pyrophoric activity of iron sulfides comprising contacting iron sulfides with an effective inhibiting amount of a treatment compound in an aerosol or in a gaseous state to inhibit pyrophoric activity of the iron sulfides, said compound being amine, nonpolymeric amide, nitrile, imide, Mannich reaction products of phenol or alkylphenol with an aldehyde and an amine, oxime, or mixtures thereof.

31. The method of claim 30 wherein the treatment compound is in an aerosol.

32. The method of claim 31 wherein said amine comprises alkylamine, arylamine, and alkanolamine.

33. The method of claim 30 wherein the treatment compound is in a gaseous state.

34. The method of claim 30 wherein said amine comprises alkylamine, arylamine, and alkanolamine.

35. A method of inhibiting pyrophoric activity of iron sulfides comprising contacting iron sulfides and/or precursors thereof with an effective inhibiting amount of a treatment compound in an aerosol or in a gaseous state to inhibit pyrophoric activity of the iron sulfides, said compound being carboxylic acid, alcohol, aldehyde, ketone, ester, phosphate, phosphite, thallus, sulfolane, or mixtures thereof.

36. The method of claim 35 wherein the treatment compound is in an aerosol.

37. The method of claim 35 wherein the treatment compound is in a gaseous state.

38. A method of inhibiting pyrophoric activity of iron sulfides comprising contacting iron sulfides and/or precursors thereof with an effective inhibiting amount of a treatment compound in an aerosol or in a gaseous state to inhibit pyrophoric activity of the iron sulfides, said compound being amine, alcohol, ketone, or mixtures thereof.

39. The method of claim 38 wherein the treatment compound is in an aerosol.

40. The method of claim 39 wherein said amine comprises alkylamine, arylamine, and alkanolamine.

41. The method of claim 38 wherein the treatment compound is in a gaseous state.

42. The method of claim 41 wherein said amine comprises alkylamine, arylamine, and alkanolamine.

* * * * *